United States Patent [19]

Nair et al.

[11] Patent Number: 5,531,913
[45] Date of Patent: Jul. 2, 1996

[54] HAZE-FREE TRANSPARENT FILM-FORMING AQUEOUS COATING COMPOSITIONS FOR MAGNETIC RECORDING LAYERS

[75] Inventors: Mridula Nair, Penfield; Lloyd A. Lobo, Webster; George L. Oltean, Rochester, all of N.Y.

[73] Assignee: Eastman Kodak Company, Rochester, N.Y.

[21] Appl. No.: 402,460

[22] Filed: Mar. 10, 1995

[51] Int. Cl.$^6$ .......................... G11B 5/702; G11B 5/633; G11B 5/712; G03C 7/24
[52] U.S. Cl. .................... 252/62.53; 252/62.52; 430/495.1; 430/496; 430/501; 430/523; 430/140; 428/694 B; 428/694 BA; 428/694 BN
[58] Field of Search ................ 252/62.53, 62.54; 430/501, 496, 140, 523, 495; 428/694 ML, 694 B, 694 BG, 694 BU, 694 BY, 694 BR, 694 BN, 694 BA

[56] References Cited

U.S. PATENT DOCUMENTS

| | | | |
|---|---|---|---|
| 4,404,253 | 9/1983 | Kohler et al. | 428/327 |
| 4,562,117 | 12/1985 | Kikukawa et al. | 428/407 |
| 4,761,338 | 8/1988 | Asano et al. | 428/425.9 |
| 4,965,007 | 10/1990 | Yudelson | 252/62.53 |
| 5,147,768 | 9/1992 | Sakakibara | 430/501 |
| 5,229,259 | 7/1993 | Yokota | 430/523 |

FOREIGN PATENT DOCUMENTS

017834A1  10/1980  European Pat. Off. .

*Primary Examiner*—Melissa Bonner
*Attorney, Agent, or Firm*—Andrew J. Anderson

[57] ABSTRACT

An aqueous coating composition for forming a transparent magnetic recording layer contains a fine solid particle aqueous dispersion of dispersed magnetic particles, gelatin, and a polyelectrolyte having a molecular weight of at least 50,000. The coating composition may be prepared by milling an aqueous slurry of magnetic particles and a surface active dispersant having an HLB number of at least 8 until there are substantially no agglomerates of magnetic particles present, and then combining the milled dispersion with the gelatin and polyelectrolyte. The coating composition can be used to prepare magnetic recording elements and, in particular, photographic elements having a transparent, substantially haze-free magnetic recording layer.

22 Claims, No Drawings

HAZE-FREE TRANSPARENT FILM-FORMING AQUEOUS COATING COMPOSITIONS FOR MAGNETIC RECORDING LAYERS

FIELD OF INVENTION

This invention relates to an imaging element comprising a transparent, haze-free magnetic recording layer with improved optical quality and to a process for the preparation thereof. More particularly, this invention relates to such a layer derived from an aqueous dispersion comprising gelatin, a polyelectrolyte that interacts with the gelatin, and magnetic particles.

BACKGROUND OF THE INVENTION

Conventional magnetic recording elements that are used for recording sounds or images are generally opaque to visible light regardless of the nature of the magnetic particles used in such elements. For example, motion picture films often are provided with a magnetic sound track which generally is opaque and does not cover that portion of the film used in the projection of images.

Canadian Patent 686,172 shows that a magnetic recording layer may be transparent to visible light when it contains low concentrations of magnetizable particles. According to this patent, such a layer is coated over a layer containing descriptive material which allows a user to simultaneously hear and see certain subject matter. However, this patent points out that the electromagnetic characteristics, i.e., the magnetic recording and reproducing characteristics, of such a layer are inferior to those of conventional magnetic layers as a result of the very low concentration of magnetizable particles.

U.S. Pat. No. 3,782,947 discloses a photographic product which carries magnetic particles distributed across the image area of the product. The particle distribution and sizes are so designed that the composite granularities of the photographic and magnetic recording media are such that the magnetic distribution is essentially transparent in a photographic sense. According to this patent, the photographic image can be viewed via the magnetic distribution and the magnetic distribution can be employed for recording and playing back information.

U.S. Pat. No. 4,279,945 discloses a process of preparing magnetic recording elements containing a transparent recording layer. According to this patent, the magnetic recording and reproducing characteristics obtained are comparable to conventional opaque magnetic layers without the need for matching the granularity of a magnetic medium to that of photographic medium. However, the process requires that the layer containing magnetic particles be treated using one or both of the following process steps, (1) compacting the layer while it is in a malleable state to reduce its thickness (e.g., calendaring), or (2) imbibing into the layer a substantially transparent liquid having a refractive index that is substantially the same as that of the binder.

Elements of the type described in the above-cited patents have not achieved widespread commercial success for various reasons. For example, the elements described in U.S. Pat. No. 4,279,945, as indicated by the figure therein, are substantially opaque at wavelengths less than about 500 nm and thus are not useful in color films. Further, the disclosed process requires that the magnetic recording layer be calendered while it is in a malleable state and/or that a transparent liquid be imbibed into the magnetic recording layer. On the other hand, U.S. Pat. No. 3,782,947 contemplates coating a dispersion containing magnetic particles onto a film base. However, the quantity of solvent required in such a process is unattractive from both an economic and environmental standpoint. Additionally, in continuous wide web coating techniques adapted for commercial manufacturing operations, solvent attack on the film base can render the element unusable, resulting in unacceptable manufacturing inefficiencies and excessive costs. Moreover, it is difficult to prepare magnetic recording layers in such a coating process having a thickness of less than about 5 microns.

U.S. Pat. No. 4,990,276 discloses a dispersion of magnetic particles, a dialkylester of phthalic acid and a dispersing agent. U.S. Patent No. 5,254,449 discloses the use of such a dispersion to provide a substantially transparent magnetic recording layer in the preparation of a novel photographic element. The process described in this patent calls for dilution of the dispersion with a binder in an organic solvent such as a mixture of methylene chloride and methanol, to form a casting composition. The casting composition is then extruded under pressure onto a photographic support.

Most magnetic recording layers which are part of imaging elements are coated from organic solvents. However, for environmental and cost reasons, it is desirable to eliminate the use of organic solvents in such applications. U.S. Pat. No. 5,147,768 discloses a method of coating an aqueous magnetic dispersion using gelatin as a binder. Copending, commonly assigned Nair U.S. patent application Ser. No. 08/229,267 et al., filed Apr. 18, 1994, now U.S. Pat. No. 5,457,012, describes the use of certain relatively low molecular weight polymeric dispersants to achieve stable aqueous magnetic dispersions from which transparent magnetic layers can be coated over imaging elements.

In the preparation of magnetic recording layers for photographic and other imaging elements it is important that the magnetic layer be transparent and free of haze in a photographic sense. This is a challenge when a very thin (e.g., <5 microns) layer is coated from an aqueous dispersion containing only a small amount of a hydrophilic binder such as gelatin. Even if a dispersion is colloidally stable prior to the coating operation, during drying of the wet coated layer the vertical force component that acts on the magnetic particles as a result of the layer drying down can cause the particles to flocculate resulting in a hazy coating with increased grain.

It is known to use synthetic polymers to increase the viscosity of aqueous gelatin solutions in multilayer coatings for rheology control. It is known, e.g., to incorporate polymers containing acid groups such as carboxyl, sulfonate or sulfate groups into coating solutions to increase their viscosity for multilayer photographic coatings. For example, U.S. Pat. No. 3,022,172 discloses sulfonates of vinyl, allyl, styrene or alkyl benzene compounds to increase the viscosity of gelatin coating solutions. Further, Photographic Science & Engineering Vol. 14, pages 178–183 discloses that ammonium salts of maleic anhydride and methyl vinyl ether, polystyrene sulfonate, poly vinyl ammonium phthalate, dextran sodium sulfate etc., can be employed as viscosity increasing agents for gelatin. U.S. Pat. No. 3,655,407 discloses acrylic acid/alkyl acrylate copolymers to increase the viscosity of gelatin solutions. Additionally U.S. Pat. No. 4,166,050 and DD 213,768 disclose maleic anhydride copolymers as viscosifiers for gelatin solutions. DE patent 276,243 suggests the use of polymers containing mixed carboxylate sulfonate groups for viscosifying gelatin solutions and increased robustness to pH changes. Similarly, DE 4,034,871 discloses copolymers of maleic anhydride having pendent sulfonic acid groups.

Polysaccharides containing anionic moieties have also been disclosed as viscosifiers for gelatin solutions. Naturally occurring polysaccharides, like carageenan, have been disclosed in U.S. Pat. No. 3,250,620. Furthermore, synthetically modified polysaccharides containing anionic moieties have been disclosed as viscosifiers for gelatin solutions. For example, U.S. Pat. No. 3,335,128 discloses cellulose sulfate with mixed cations. U.S. Pat. No. 2,767,410 discloses polysaccharides where 50% of the hydroxyl groups are acetylated or sulfated. DE 3,914,947 discloses sulfoethyl substituted cellulose.

Anionic synthetic polymers and polysaccharides have also been disclosed for use in the preparation of silver halide photographic emulsions. These can be used for several purposes. U.S. Pat. Nos. 2,772,165; 3,241,969 and 3,341,333 disclose anionic polymers acting either alone or in combination with other materials to coagulate and precipitate the emulsion. GB 1,064,215 discloses the use of sulfoalkylated polysaccharides to increase the covering power of the coated emulsion. Yet another application is disclosed in U.S. Pat. No. 3,811,897 to reduce the sedimentation of emulsions.

U.S. Pat. No. 5,147,768 discloses the use of various hydrophilic polymers, including polyacrylic acid, as possible replacements for gelatin as the hydrophilic film forming binder in aqueous magnetic coatings. There is no suggestion, however, to use any particular type of hydrophilic polymer at any certain percentage in combination with gelatin to control the haze of the resulting coating and to yield transparent magnetic coatings of improved optical quality.

The above cited patents disclosing the use of viscosifying coating aids generally relate to the improvement of multilayer coating uniformity, primarily by changing the rheological properties of the coating melt of the bottom-most layer. There is no suggestion, however, to use such materials in a transparent magnetic layer in order to obtain haze-free layers where the problem to be solved is one of reducing the mobility of the magnetic particles during the coating and drying process. Generally, such layers are coated as the top-most layer in a coating pack. We have found that the use of polyelectrolytes can solve the problem by increasing the viscosity of the continuous phase thereby improving the stability of the wet layer that is laid down on the support.

PROBLEMS TO BE SOLVED BY THE INVENTION

One of the problems faced when using aqueous colloids such as gelatin as the binder for a transparent magnetic coating layer is the selection of an optimum level for the binder. For a given transparency requirement, if the ratio of binder to magnetic particles is too high, the thickness of the final coated element will be high which will diminish the strength of the magnetic signal. Lowering the level of gelatin to give thinner (e.g., <5 microns) coatings can give rise to 2 inherent problems: 1) the coated product will not chill set when needed in an adequate amount of time, creating nonuniformities during the drying operation and 2) as a result of velocity gradients existing in the coating operation as well as the high vertical component of the compaction forces during the drying operation, otherwise well dispersed magnetic particles may move and orient themselves in one direction or flocculate. The result of the second effect will be increased haze and graininess in the resulting dried coating.

Accordingly, it would be desirable to provide an imaging element, such as a photographic element, with an aqueous coated magnetic layer of the desired transparency obtained from a coating composition that is not prone to haze formation upon coating thin layers by reducing the mobility of the magnetic particles during coating and drying, without a resulting increase in the quantity of the non-magnetic material laydown, and without increasing layer thickness. Any addenda used to accomplish the above objective should have the following additional properties—i) it should be water soluble or dispersible, ii) it should be compatible with binders such as gelatin and other required coating additives and, most importantly iii) it should be transparent in the coating.

SUMMARY OF THE INVENTION

The haze-free, transparent magnetic recording layers of this invention comprise a dispersion of magnetic particles, gelatin, and a polyelectrolyte.

One aspect of this invention comprises a coating composition comprising a fine solid particle aqueous dispersion of dispersed magnetic particles, gelatin, and from 0.1–50 wt. %, based on the weight of the gelatin, of a polyelectrolyte having a molecular weight of at least about 50,000 that is capable of interacting with the gelatin so as to improve the stability of the wet coating.

A further aspect of this invention comprises a photographic element comprising a photographic support, a light sensitive layer and a transparent magnetic recording layer, wherein the magnetic recording layer has been prepared by adding an aqueous solution of gelatin and a polyelectrolyte that is capable of interacting with the gelatin to a dispersion of magnetic particles in an aqueous medium to form a coating composition and applying the coating composition onto the photographic support.

Another aspect of this invention comprises a process for preparing a photographic element having a transparent magnetic recording layer which comprises adding gelatin and a polyelectrolyte that is capable of interacting with the gelatin to a dispersion of magnetic particles in an aqueous medium to form a coating composition and applying said composition onto a photographic support.

In preferred embodiments of the invention, the dispersions of magnetic particles in an aqueous medium also contain a surface active dispersant having an HLB number of at least 8 and a relatively low molecular weight of less than 50,000.

This invention provides an imaging element which contains a haze-free, transparent magnetic recording layer with improved optical quality. This invention also provides an imaging element having excellent magnetic characteristics and which is photographically transparent by virtue of its low granularity and optical density. An additional advantage of this invention is that a coating of uniform thickness is obtained from solutions containing low levels of gelatin using conventional coating equipment, such as bead coating and curtain coating equipment. Yet another advantage of this invention is that flow of the coated layer subsequent to the coating operation and prior to the drying operation is minimized.

DETAILED DESCRIPTION OF THE INVENTION

This invention relates to transparent layers containing magnetic particles, the layers being capable of having coded information written and read therefrom. The transparent layers containing magnetic particles in accordance with this invention are particularly applicable for use in combination with photographic elements wherein information can be written into the magnetic layer without affecting the quality and performance of the light-sensitive photographic elements. It is a feature of this invention that the transparent magnetic layers are prepared from a stable aqueous dispersion of magnetic particles that contains both gelatin and a polyelectrolyte that is capable of interacting with the gelatin in such a way as to increase the viscosity of the medium, thereby reducing the mobility of the magnetic particles during coating and drying.

The magnetic layer may comprise, for example, fine ferromagnetic powders such as ferromagnetic gamma-iron oxides, cobalt surface-treated ferromagnetic iron oxides, cobalt-doped ferromagnetic iron oxides, cobalt containing $Fe_2O_3$, ferromagnetic magnetites, cobalt-containing ferromagnetic magnetites, ferromagnetic chromium dioxides, ferromagnetic metal powders, ferromagnetic iron powders, ferromagnetic alloy powders and the class of ferromagnetic ferrite powders including barium ferrites. Additionally, the above mentioned powder particles may be modified to provide lower light extinction and scattering coefficients by providing them with a shell, of at least the same volume as the magnetic core, of a low refractive index material that has its refractive index lower than the transparent polymeric material used to form the magnetizable layer. Typical shell materials may include amorphous silica, vitreous silica, glass, calcium fluoride, magnesium fluoride, lithium fluoride, polytetrafloroethylene and fluorinated resins. Examples of the ferromagnetic alloy powders include those comprising at least 75% by weight of metals which comprise at least 80% by weight of at least one ferromagnetic metal alloy (such as Fe, Co, Ni, Fe-Co, Fe-Ni, Co-Ni, Co-Ni-Fe) and 20% or less of other components (such as Al, Si, S, Sc, Ti, V, Cr, Mn, Cu, Zn, Y, Mo, Rh, Re, Pd, Ag, Sn, B, Ba, Ta, W, Au, Hg, Pb, La, Ce, Pr, Nd, Te, and Bi). The ferromagnetic metals may contain a small amount of water, a hydroxide or an oxide. In addition, magnetic oxides with a thicker layer of lower refractive index oxide or other material having a lower optical scattering cross section as taught in U.S. Pat. No. 5,252,444 may also be used.

The dispersion in accordance with this invention contains magnetic particles which preferably are acicular or needle like magnetic particles. The average length of these particles along the major axis preferably is less than about 0.3, more preferably, less than about 0.2 micron. The particles preferably exhibit an axial ratio, that is, a length to diameter thickness ratio of up to about 5 or 6 to 1. Preferred particles have a specific surface area of at least 30 $m^2/g$, more preferably of at least 40 $m^2/g$. Typical acicular particles of this type include for example, particles of ferro and ferro iron oxides such as gamma-ferric oxide, complex oxides of iron and cobalt, various ferrites and metallic iron pigments. Alternatively, small tabular particles such as barium ferrites and the like can be employed. The particles can be doped with one or more ions of a polyvalent metal such as titanium, tin, cobalt, nickel, zinc, maganese, chromium, or the like as is known in the art.

A preferred particle consists of Co surface treated $—Fe_2O_3$ having a specific surface area of greater than 40 $m^2/g$. Particles of this type are commercially available and can be obtained from Toda Kogyo Corporation under the trade names CSF 4085V2, CSF 4565V, CSF 4585V and CND 865V and are available on a production scale from Pfizer Pigments Inc. under the trade designations RPX-4392, RPX-5003, RPX-5026 and RPX-5012. For good magnetic recording, the magnetic particles preferably exhibit coercive force above about 500 Oe and saturation magnetization above 70 emu/g.

In accordance with a preferred embodiment of this invention, the transparent magnetic layer is prepared by initially forming a concentrated dispersion of the magnetic particles in water, subsequently adding an aqueous solution of gelatin and a polyelectrolyte to the magnetic particle dispersion to form a coating composition, and then applying the coating composition onto a support. The concentrated dispersion of magnetic particles in water is advantageously prepared together with a surface active dispersant having an HLB number of at least 8, preferably an amphipathic water-dispersible or soluble polymeric surface active dispersant having a molecular weight of less than 50,000. Surface active dispersants for the purposes of this invention are those which are capable of depressing the surface tension of distilled water by at least 20 dynes/cm at their critical micelle concentration at 25° C. The concentrated dispersion of magnetic particles may be formed by milling an aqueous mixture of the magnetic particles and the dispersant in a device such as a ball mill, a roll mill, a high speed impeller mill, media mill, an attritor, a sand mill or the like. Milling is generally continued for a sufficient time to ensure that substantially no agglomerates of the magnetic particles remain as described in co-pending, commonly assigned U.S. patent application Ser. No. 08/229,267, filed Apr. 18, 1994, the disclosure of which is incorporated by reference.

The concentration of the magnetic particles in the dispersion is preferably about 5 to about 75%, more preferably about 10 to about 50% and most preferably about 15 to about 40%, the percentages being by weight based on the weight of the dispersion. The length of time required depends on the particular milling device used. In general, milling should be continued from about 0.5 to about 8 hours, preferably from about 1 to about 4 hours.

As mentioned above, the magnetic particles are preferably milled in an aqueous slurry containing a dispersant having an HLB number of at least 8. The HLB number of a dispersant is a measure of the hydrophilic/lipophilic balance of the dispersant and can be determined as described in "Polymeric Surfactants," Surfactant Science Series, volume 42, page 221, by I. Piirma.

The general class of preferred dispersants are water-soluble or water-dispersible surface active polymers represented by one of the following structures I–IV:

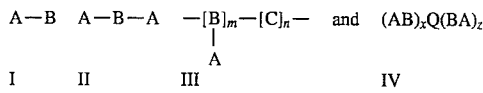

wherein each A independently represents 1 to about 150 repeat units of a water-soluble component, B and C each represent a linear or branched alkyl, aryl, alkaryl or cyclic alkyl radical containing at least 7 carbon atoms, or 3 to about 100 repeat units of a propylene oxide or higher alkylene oxide or combinations thereof, Q represents a multivalent linking group, m=50–100 mole %, n=1–50 mole %, with the proviso that m+n=100 mole %, x=1 or 2 and z=1 or 2.

A is preferably a poly(ethylene oxide) unit, but can be any other water-soluble unit, such as polyethyloxazoline, poly(vinyl alcohol), poly(vinyl pyrrolidone) or the like. B and C are radicals containing at least 7 carbon atoms, preferably 7 to 500 carbon atoms and more preferably, 15 to 300 carbon atoms. Illustrative radicals include, for example, $C_{20}$–$C_{50}$ alkyl, copolymer of maleic anhydride and an alkene, arylphenoxy, alkylphenoxy, poly(propylene oxide), poly(butylene oxide), or the like. Q is a multivalent linking group having the valence of X+Z. Preferably Q is a polyamine such as ethylene diamine, tetramethylene diamine, etc., a polyhydroxy compound, such as pentaerythritol, or the like. Preferably, these polymeric dispersants have an average molecular weight of from about 500 to 50,000, more preferably about 500 to 25,000, most preferably about 1,000 to 10,000.

Generally, surface active dispersants useful in the present invention are well known in the art and some of them are commercially available. Typically the dispersant comprises water-soluble or dispersible block copolymers either linear or branched. Preferred dispersants comprise various poly(ethylene oxide) containing block copolymers. Examples of preferred dispersants are illustrated for example by the ethoxylated compounds as listed below.

| Trade Name | Manufacturer | Chemical Identification | HLB |
| --- | --- | --- | --- |
| Unithox ethoxylates | Petrolite | ethoxylated C24–50 n-alkane alcohols | 10–16 |
| Dapral GE202 | Akzo | partial ester of a branched carboxylic acid copolymer | >10 |
| Tetronic 908 | BASF Corporation | block copolymer of poly(ethylene oxide) and poly(propylene oxide) | >24 |
| Syn Fac 334 | Milliken Chemical | Arylphenol ethoxylate | 11 |
| Syn Fac 8216 | Milliken Chemical | Arylphenol ethoxylate | 15 |
| Svn Fac 8210 | Milliken Chemical | Polyalkoxylated aryl-phenol | 11 |
| Syn Fac 8337 | Milliken Chemical | Potassium salt of a phosphated alkoxylated aryl-phenol | 20 |

More specifically, illustrative preferred dispersants have the following structures:

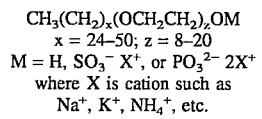

$CH_3(CH_2)_x(OCH_2CH_2)_zOM$
x = 24–50; z = 8–20
M = H, $SO_3^-$ $X^+$, or $PO_3^{2-}$ $2X^+$
where X is cation such as
$Na^+$, $K^+$, $NH_4^+$, etc.

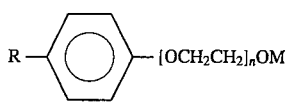

n = 5–25
R = aryl, alkyl, aralkyl
M = H, $SO_3^-$ $X^+$, or $PO_3^{2-}$ $2X^+$
where X is cation such as
$Na^+$, $K^+$, $NH_4^+$, etc.

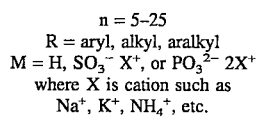

n = 10–20; x = 5–20

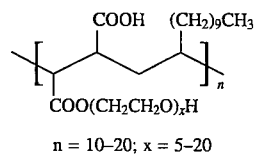

PEO = poly(ethylene oxide)
PPO = poly(propylene oxide)

The preferred dispersants are amphipathic in nature. Such a dispersant comprises in its molecule an oleophilic group of sufficient length to adsorb firmly to the surface of the dispersed particles and also comprises a hydrophilic group of sufficient length to provide a large enough steric barrier to interparticle attraction. The dispersant may be nonionic or ionic in nature. These amphipathic dispersants are generally block copolymers, either linear or branched and have segmented hydrophilic and oleophilic portions. The hydrophilic segment may or may not comprise ionic groups and the oleophilic segment may or may not comprise polarizable groups. The dispersants utilized in the present invention are believed to function essentially as steric stabilizers in protecting the dispersion against formation of elastic and other flocs leading to increased viscosity of the aqueous dispersion. Ionic groups, if present, in the hydrophilic segment of the dispersant provide added colloidal stabilization through ionic repulsion between the dispersed particles. The polarizable groups, if present, in the oleophilic segment of the dispersant further enhance association of the dispersant through these anchoring sites with certain flocculation-prone solid particles that are polar in nature. Preferred dispersants comprise various poly(ethylene oxide) containing nonionic and anionic block copolymers. Particularly preferred are dispersants having anionic groups. Most preferred are phosphated alkyl or aryl phenol alkoxylates, such as dispersants of the formula:

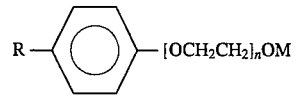

In general, the amount of dispersant used is preferably about 5 to about 200%, more preferably about 20 to about 100% and most preferably about 25 to 75%, the percentages being by weight of the magnetic particles.

In making the dispersion, it may be advantageous to include an ionic small molecule surfactant (i.e. nonpolymeric surfactants generally of molecular weight less than 1,000) for providing added stability through ionic repulsions. These act as antiflocculating agents. They can be added before or after the milling step. Representative examples of small molecular surfactants are listed below.

$CH_3(CH_2)_7CH=CH(CH_2)_7CO$ SMS-1
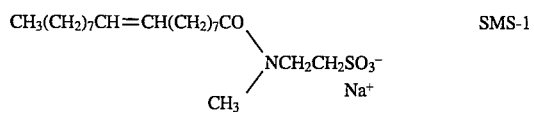

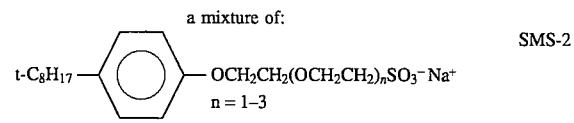
SMS-2 and

$CH_3-(CH_2)_{11}-SO_4^-$ $Na^+$ SMS-3

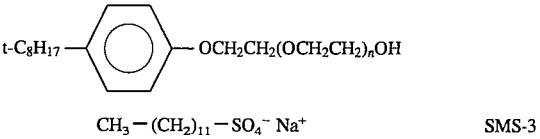
SMS-4

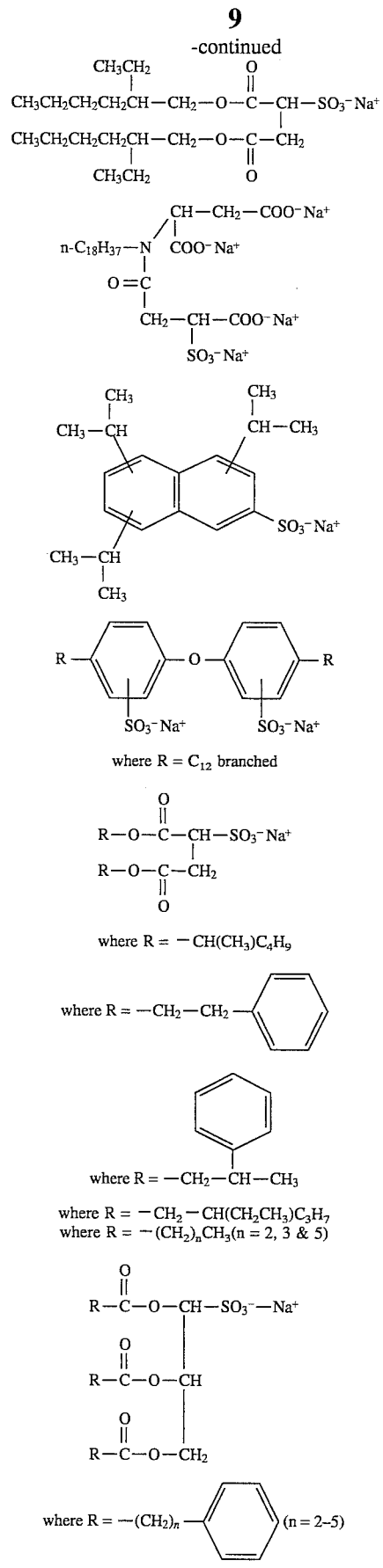

SMS-5

SMS-6

SMS-7

SMS-8

SMS-9

SMS-10

SMS-11

SMS-12
SMS-13

SMS-14

SMS-15

The aqueous magnetic particle dispersion in accordance with this invention are employed in the fabrication of recordable magnetic layers or films and photographic elements that include a support, a light-sensitive layer and a transparent magnetic recording layer. Transparent magnetic recording layers or films would have widespread application in many environments wherein it would be desirable to include or encode information without interfering with the visual appearance of the object onto which the magnetic recording is made. For example, in a sheet of written text or a picture, information could be recorded in a transparent magnetic recording layer without interfering with the visual appearance of the text or the picture underlying the transparent magnetic recording layer. Such transparent recording layers can be prepared by incorporating a film forming binder in the aqueous dispersion to form a coating composition and then applying the coating composition to a substrate. For example, if it were desired to provide magnetically encoded information to this page of text, this page can be coated with the magnetic coating composition. This would then enable one not only to read the visual text in the normal manner but also to read out the information contained in the encoded transparent magnetic layer.

The primary utility for transparent magnetic recording layers is in the photographic industry wherein a photographic film can be built onto a substrate that includes a transparent recording layer. The transparent magnetic recording layer may be disposed in any position relative to the various layers of the photographic film including over the light sensitive layers, within the layers, within the base substrate, however, it is preferred that the transparent magnetic layer be applied as a layer on the side opposite the light-sensitive layers of the photographic film. This provides ease of encoding and readout. This can be achieved by coating applications widely known in both the photographic and magnetic recording fields of technology. Information can then be encoded into the magnetic layer during all steps of the preparation of the photographic product. This can include manufacturing data with regard to the various layers that are employed during the preparation of the film, information with regard to the properties of the various layers built onto the substrate and the like. Further, after the film is completed and is being used by the consumer, many and various applications can be envisioned wherein information is included in the magnetic layer that is helpful to the photographer, the developing laboratory and others engaged in this field of endeavor. For example, when a camera also has the capability of imparting data to a magnetic layer by having built in recording heads in the camera, information with regard to each frame of the film can be recorded, such as, the light conditions, the speed at which the frame is exposed, the F-Stop number and the like.

To apply a transparent magnetic layer to a support, a coating composition is prepared, for example by dispersing the aqueous magnetic particle dispersion in an aqueous medium containing a hydrophilic binder. Examples of hydrophilic binders which can be used are those described in Research Disclosure No. 308119, December 1989, and No. 18716 (page 651) November 1979. In accordance with the invention, gelatin is used as a hydrophilic binder. For the purposes of this invention, the term "gelatin" includes gelatin and gelatin derivatives, such as gelatin derivatized with aromatic sulfonyl chlorides, carboxylic acid chlorides, carboxylic acid anhydrides, aryl isocyanates, 1,4-diketones, etc. Gelatin may be any of so-called alkali-treated (lime treated) gelatin which was immersed in an alkali bath, prior to extraction thereof, an acid-treated gelatin which was immersed in an alkali bath prior to extraction thereof, an acid-treated gelatin which was immersed in both baths and enzyme-treated gelatin.

Polymeric agents which increase the viscosity of aqueous solutions can be broadly classified into two groups, very high molecular weight materials which can increase the viscosity of a solution by virtue of their molecular weight per se, and high molecular weight polyelectrolytes as described herein which viscosify a solution through forming associative complexes with the charged groups of binders present in the aqueous medium. Examples of the former category are methylcellulose, hydroxyethylcellulose, polyacrylamides, etc. An inherent problem in using these materials as viscosifiers is the relatively large amounts of material needed which will not efficiently solve the problem of increasing the ratio of magnetic to non-magnetic material in a transparent layer. Additionally, these materials frequently become incompatible with gelatin upon heating and drying. Polyelectrolytes which interact with gelatin, on the other hand, result in the formation of large size complexes even at low added levels which can result in relatively large increases in the low shear viscosity ($\gamma<10s^{-1}$) of these solutions. Most importantly, these types of materials can be employed in relatively small amounts in order to render the particles substantially immobile during the drying process.

In accordance with a preferred embodiment of this invention, the haze-free transparent magnetic layer is prepared by forming a coating composition prepared by incorporating into the dispersion containing finely dispersed magnetic particles and gelatin, a polyelectrolyte or mixture of polyelectrolytes having a molecular weight above 50,000 selected from the following: i) a water soluble or dispersible synthetic polymer derived from monomers having one or more pendant anionic moieties selected from —$OSO_3M$, —$SO_3M$, —COOM, —$OPO(OM)_2$, where M represents a hydrogen atom or a cationic counterion such as an alkali metal, an alkaline earth metal atom or a quaternary ammonium base, etc., and ii) naturally occurring polymeric materials, such as polysaccharides, that have pendant anionic groups or have been modified to have anionic groups as described in i).

Generally, the polyelectrolytes useful in the present invention are well known in the art and some are commercially available. Typically they comprise synthetic water soluble homo- or co-polymers bearing pendant ionic groups as described above, or water dispersible polymers such as polymeric latices with similar ionic surface groups. The copolymers comprise addition or condensation copolymers. Examples of preferred polyelectrolytes include polystyrene sulfonate, poly(acrylamide-co-2-acrylamido-2-methylpropane sulfonate), poly(styrene-co-maleic acid), polyesterionomers such as Eastman AQ55D™, latices such as acrylic acid containing copolymers. Since the association between the polyelectrolyte and the gelatin is ionic in nature, the preferred polyelectrolytes include those in which the level of the ionic component and the molecular weight is the highest. Here the efficiency of the polyelectrolyte is the highest, i.e., the smallest quantity is required to perform its job. In some cases, however, to ensure its compatibility with the gelatin binder and other components, copolymers are used with a judicious choice of the comonomers and the molecular weight of the polyelectrolyte.

The polyelectrolytes may also be naturally occurring polymers that have pendant anionic groups or have been modified to have anionic groups such as described above. An examples of the former is xanthan gum. Examples of the latter are dextran sulfate and cellulose sulfate, carboxylated or sulfonated carbohydrate ethers and sulfated polysaccharides.

The polyelectrolyte and the gelatin are preferably combined in an aqueous solution at temperatures above the gel setting temperature and are well mixed prior to addition of the magnetic dispersion.

The preferred average molecular weight of the polyelectrolyte polymers is in the range of 50,000–6,000,000, more preferably from about 100,000–6,000,000. The polyelectrolyte also preferably comprises from about 2 to 100 weight percent of units derived from anionic monomers, more preferably about 10 to 100 weight percent, and most preferably about 50 to 100 weight percent. The percentage of anionic monomer required to efficiently increase the viscosity of the coating solution through association with gelatin is generally inversely proportional to the molecular weight of the polyelectrolyte. The amount of polyelectrolyte used is preferably about 0.1 to 50 wt %, more preferably from about 0.1 to 25 wt % and most preferably about 1 to 10 wt %, the percentages being by weight of the gelatin. The amount of polyelectrolyte required to provide a coating solution viscosity sufficient to achieve haze free magnetic coatings is generally inversely proportional to the gelatin concentration. If the level of polyelectrolyte is too low to provide effective association with the gelatin, coatings tend to be hazy, while if the level is very high the coating solution viscosity may be too high for efficient coating operations. Additionally, it is desired to optimize the combined level of gelatin and polyelectrolyte in order to minimize layer thickness as thicker transparent magnetic layers may result in spacing losses for the magnetics.

Illustrative examples of polyelectrolytes which can be advantageously used in the present invention have the following structures. While not indicated in all the structures, the anionic substituents are associated with either hydrogen or a cationic counterion such as sodium, etc.

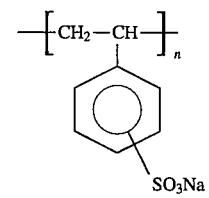
P-1

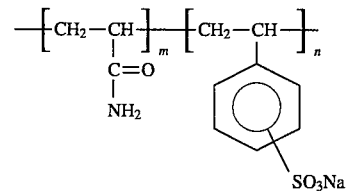
P-2

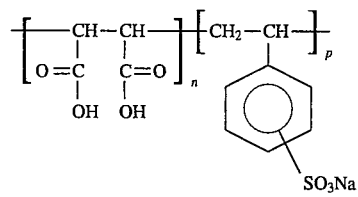
P-3

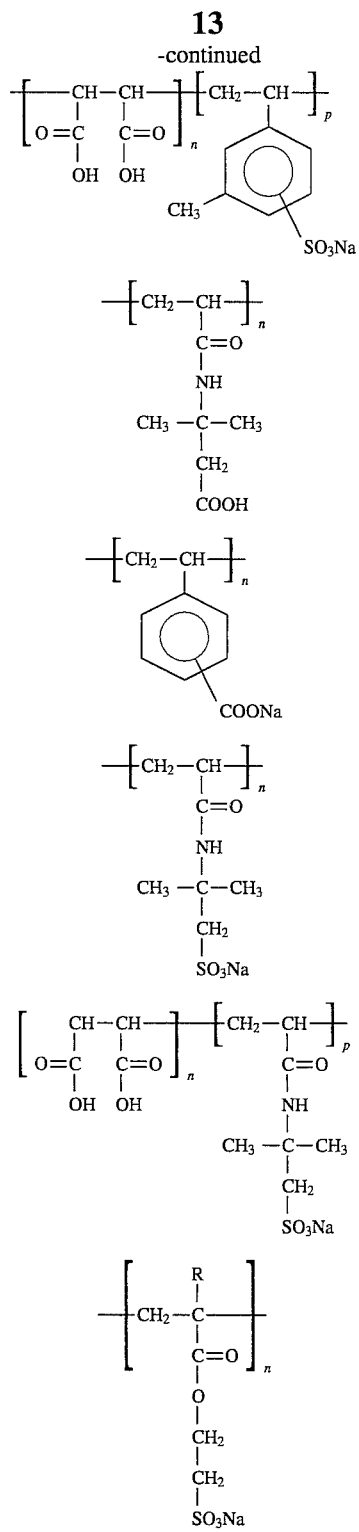
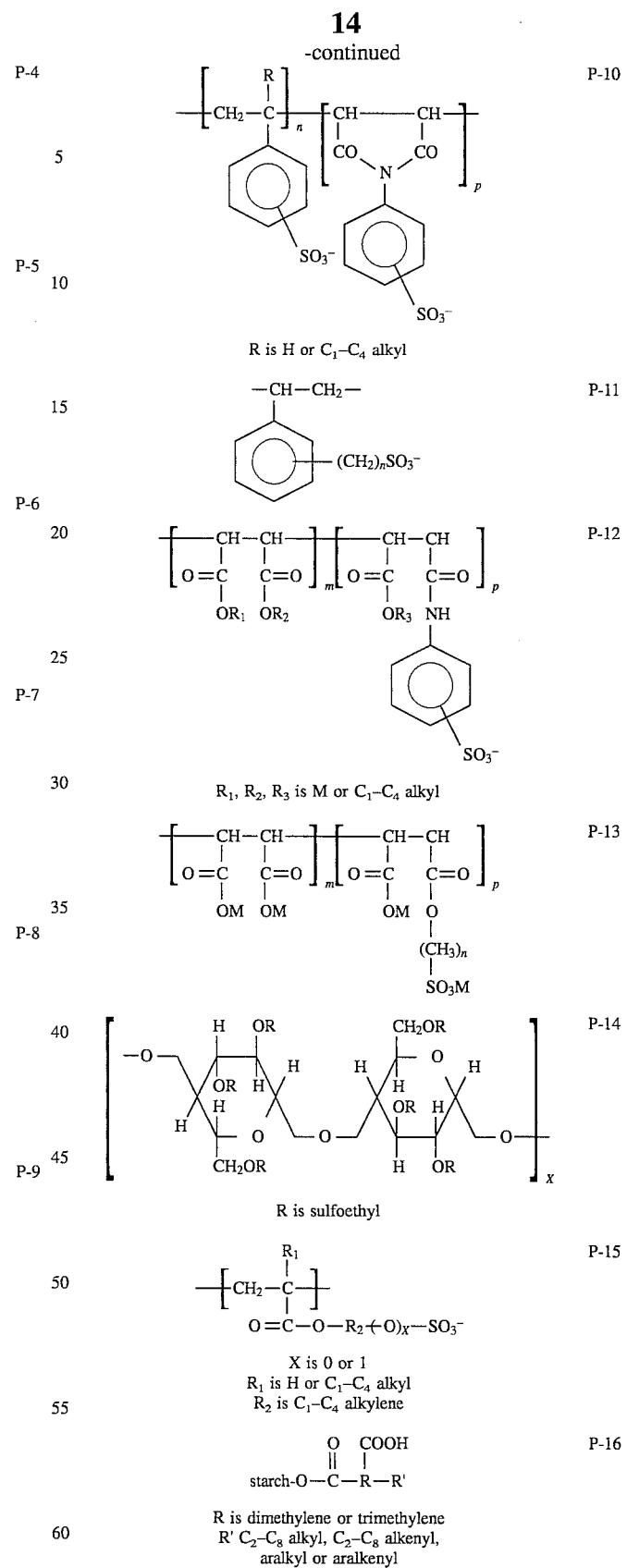

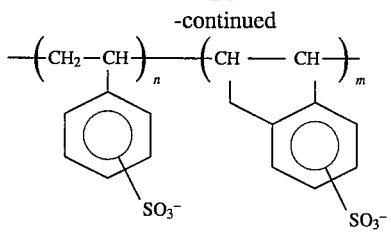

P-17

The above described coating composition containing the dispersed magnetic particles, dispersant, gelatin and polyelectrolyte is coated onto a suitable support either as is or along with additional or optional ingredients such as, crosslinking or hardening agents, coating aids, abrasive particles, lubricants, matting agents, antistatic agents, fillers and the like. The coating composition can be chill-set and stored prior to use, then heated to coating temperature (40–60° C.) just prior to coating. This cooling and re-heating does not adversely affect the quality of the coating or the magnetic properties of the resulting transparent magnetic recording layer.

The coating composition is applied to a suitable support which may contain additional layers for promoting adhesion, by any suitable coating device including slot die hoppers, gravure coaters, reverse roll coaters and the like. The thickness of the magnetic layer preferably should be about 0.5 to about 5 μm and most preferably about 1 to about 3 μm.

The magnetic layer can also be overcoated with conventional layers including antistats, protective overcoats, lubricants and the like.

Any suitable support may be employed in the practice of this invention, such as, cellulose derivatives including cellulose diacetate, cellulose triacetate, cellulose propionate, cellulose butyrate, cellulose acetatepropionate and the like; polyamides; polycarbonates; polyesters, particularly polyethylene terephthalate, poly-1,4-cyclohexanedimethylene terephthalate, polyethylene 1,2-diphenoxyethane-4,4'-dicarboxylate, polybutylene terephthalate and polyethylene naphthalate; polystyrene, polypropylene, polyethylene, polymethyl-pentene, polysulfone, polyethersulfone, polyarylates, polyether imides and the like. Supports for photographic elements are described in Research Disclosure, December 1989, Item 308,119 published by Kenneth Mason Publications, Ltd., Dudley Annex, 12a North Street, Emsworth, Hampshire P010 7DQ, England, section XVII, incorporated herein by reference. Particularly preferred supports are polyethylene terephthalate, polyethylene naphthalate and the cellulose esters particularly cellulose triacetate.

Thickness of those supports used in the present invention is preferably from 50 to 180 μm, more preferably 85 to 125 microns. In addition, various dyes may be formulated into the support or the magnetic layer to give neutral density. Depending upon the nature of the support, suitable transparent tie or undercoat layers may be desired. Particularly with regard to polyester supports, primers are used in order to promote adhesion. Any suitable primers in accordance with those described in the following U.S. Patents may be employed: 2,627,088; 3,501,301; 4,689,359; 4,363,872; and 4,098,952. Each of these is incorporated herein by reference in their entirety.

The magnetic recording layer of the present invention containing gelatin is preferably hardened. Hardeners usable for hardening the magnetic recording layer include, for example, aldeyhde compounds such as formaldehyde and glutaraldehyde; ketone compounds such as diacetyl and cyclopentanedione; compounds having reactive halogens such as bis(2-chloroethylurea), 2-hydroxy-4,6-dichloro-1,3, 5-trizine and those described in U.S. Pat. Nos. 3,288,775 and 2,732,303 and British Patent Nos. 974,723 and 1,167,207; divinylsulfone, 5-acetyl-1,3-diacrylolhexahydro-1,3,5-triazine and reactive olefin-containing compounds such as divinylsulfone, 5-acetyl-1,2-diacryloyl-hexahydro-1,3,5-triazine, and the compounds such as divinylsulfone, 5-acetyl-1, 3-diacryloyl-hexahydro-1,3,5-triazine, and the compounds disclosed in U.S. Pat. Nos. 3,635,718 and 3,232,763, and British Patent 994,869; N-hydroxymethylothalimide; N-methylol compounds such as N-hydroxymethylphthalimide and those described in U.S. Pat. Nos. 2,732,316 and 2,586,168; isocyanates described in U.S. Pat. No. 3,103,437; the aziridines disclosed in U.S. Pat. Nos. 3,017,280 and 2,983,611; acid derivatives described in U.S. Pat. Nos. 2,725,294 and 2,725,295; epoxy compounds described in U.S. Pat. No. 3,091,537; and halogenated carboxyaldehydes such as mucochloric acid. Examples of inorganic hardeners include chrome alum, zirconium sulfate and the carboxyl group activating hardeners described in Japanese Patent Publication for opposition purpose (herein after referred to as J. P. Kokoku) Nos. 56-12853 and 58-32699, Belgian Patent No. 825,726, J. P. Kokai Nos. 60-225148 and 51-126125, J. P. Kokoku No. 58-50699, J. P. Kokai No. 52-54427 and U.S. Pat. No. 3,321,313.

The hardener is generally used in an amount of from 0.01 to 30 weight %, preferably from 0.05 to 20 weight %, to the amount of dried gelatin.

As mentioned above, additional ingredients can be included in the coating composition of this invention. In certain embodiments of the invention, the coating composition (and thus, the magnetic layer) contains abrasive particles or reinforcing fillers.

Examples of abrasive and/or reinforcing filler particles include nonmagnetic inorganic powders with a Mohs scale hardness of not less than 6. Specific examples are metal oxides such as alpha-alumina, chromium oxide (e.g., $Cr_2O_3$), iron oxide (e.g., alpha-$Fe_2O_3$), silicon dioxide, alumino-silicate and titanium dioxide; carbides such as silicon carbide and titanium carbide; nitrides such as, silicon nitride, titanium nitride; tin oxide, doped tin oxide, such as antimony or indium doped tin oxide; metal antimonates such as zinc antimonate and indium antimonate; and diamond in fine powder. Alpha alumina and silicon dioxide are the preferred abrasives in accordance with this invention. The abrasive and reinforcing filler particles can be pre-dispersed in water using the same dispersants as described in this invention and then incorporated into the coating composition.

Tin oxide particles in any form may be employed such as tin oxide per se or doped tin oxides, such as, antimony or indium doped tin oxide. The tin oxides and metal antimonates referred to above may be used in either the conductive or non-conductive form; however, when in the conductive form, an additional advantage is gained in that the layer also acts as an antistat. Suitable conductive particles are disclosed in U.S. Pat. Nos. 4,495,276; 4,394,441; 4,431,764; 4,418,141 and 4,999,276 incorporated herein by reference. Useful tin oxide particles are commercially available from Keeling and Walker, Ltd. under the trade designation Stanostat CPM 375; DuPont Co. under the trade designation Zelec-ECP 3005XC and 3010SC and Mitsubishi Metals Corp. under the trade designation T-1. Preferred metal antimonates include those having rutile or rutile-related crystallographic structures as disclosed in U.S. Pat. No. 5,368,995, the disclosure of which is incorporated by reference herein.

As noted, photographic elements in accordance with this invention comprise at least one photosensitive layer. Such photosensitive layers can be image-forming layers containing photographic silver halides such as silver chloride, silver bromide, silver bromoiodide, silver chlorobromide and the like. Both negative and reversal silver halide elements are contemplated. For reversal films, the emulsion layers as taught in U.S. Pat. No. 5,236,817, especially Examples 16 and 21, are particularly suitable. Any of the known silver halide emulsion layers, such as those described in Research Disclosure, Vol. 176, December 1978 Item 17643 and Research Disclosure Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. For multicolor elements, layers can be coated simultaneously on the composite support film as described in U.S. Pat. Nos. 2,761,791 and 3,508,947. Additional useful coating and drying procedures are described in Research Disclosure, Vol. 176, December 1978, Item 17643. Suitable photosensitive image forming layers are those which provide color or black and white images.

As is taught in U.S. Pat. No. 3,782,947 noted above, whether an element is useful for both photographic and magnetic recording depends on both the size distribution and concentration of the magnetic particles and on the relationship between the granularities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 10 and 1000 mg/m$^2$ when uniformly distributed across the desired area of the photographic element will be sufficiently photographically transparent provided that the maximum particle size is less than about 1 micron. Particle concentrations less than about 10 mg/m$^2$ tend to be insufficient for magnetic recording purposes and particle concentrations greater than about 1000 mg/m$^2$ tend to be too dense for photographic purposes. Particularly useful particle concentrations are in the range of 20–70 mg/m$^2$. Concentrations of about 20 mg/m$^2$ have been found to be particularly useful in reversal films and concentrations of about 40 mg/m$^2$ are particularly useful in negative films.

The photographic elements according to this invention can contain one or more conducting layers such as antistatic layers and/or anti-halation layers such as such as described in Research Disclosure, Vol. 176, December 1978, Item 17643 to prevent undesirable static discharges during manufacture, exposure and processing of the photographic element. Antistatic layers conventionally used in color films have been found to be satisfactory for use herewith. Any of the antistatic agents set forth in U.S. Pat. No. 5,147,768, which is incorporated herein by reference may be employed. Preferred antistats include metal oxides, for example, tin oxide, antimony doped tin oxide, vanadium pentoxide, and metal antimonates.

The photographic elements according to this invention can be provided with a protective or lubricating layer, such as a wax layer, in or over the transparent magnetic recording layer. Suitable lubricants include silicone oil, silicones having polar groups, fatty acid-modified silicones, fluorine-containing silicones, fluorine-containing alcohols, fluorine-containing esters, polyolefins, polyglycols alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms.

Specific examples of these compounds (i.e., alcohols, acids or esters) include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol.

The following examples illustrate the preparation of haze-free and transparent magnetic recording layers of high optical quality in accordance with this invention.

EXAMPLES

Example 1

A finely divided concentrate of a magnetic material was made by milling 23.13 parts of Co-surface treated-γ-iron oxide powder (CSF 4085V2, Toda Kogyo) and 23.13 parts of a 50% by weight solution of the dispersant Syn Fac 8337 (sold by Milliken Chemical) in 65.3 parts deionized water in a media mill. The sample was milled for 2–3 hours until the average particle size was down to 0.25 microns.

To 5.624 g of a 8.89% aqueous solution of deionized cowbone gelatin at 39° C. was added 0.287 g of a 8.7% aqueous solution of polystyrene sulfonate, sodium salt (TL502, National Starch Chemical Company), as the polyelectrolyte and 11.07 g of distilled water and mixed well (5% polyelectrolyte based upon weight of the gelatin). To this was added 0.114 g of the magnetic dispersion and the mixture stirred at that temperature to yield a fine dispersion of ferric oxide in the combined polyelectrolyte and gelatin. This mixture was treated with 0.105 g of a 25.24% ball-milled aqueous dispersion of alpha-alumina abrasive particles (AKP50, Sumitomo Chemical Company).

The dispersion thus obtained was treated with 0.4 g of 10% nonylphenoxy polyglycerol (obtained from Olin under the trade designation Olin 10G) and 0.4 g of 5% dioctyl ester of sodium sulfosuccinic acid (obtained from American Cyanamid under the trade designation Aerosol OT100) as coating aids, and 2 g of a 2% solution of the hardner, bis(vinyl sulfonyl methyl ether), and coated on gel subbed cellulose triacetate at room temperature using a coating knife with a spacing of 0.002 inch and dried at room temperature.

EXAMPLES 2–11

Coated samples of magnetic recording layers were prepared as in Example 1, using higher levels of polystyrene sulfonate of the type used in Example 1 (Examples 2 and 3), or substituting various other polyelectrolytes within the scope of the invention (Examples 4–8) or comparative polymeric additives (Examples 9–10) or additional gelatin (Example 11) for the polystyrene sulfonate of Example 1 at equal weight.

Measurement of Optical Quality

The optical quality of the magnetic coatings prepared in Examples 1–11 was measured by determining the Quality Factor of the dried magnetic coating on a transparent support. The term "Quality Factor" (QF) as used herein is a measure of the optical quality, the corresponding haze and transparency of the coating as they relate to the rate of decay of the light absorbance of the coating between about 390 and 800 nm. The rate of decay is determined by calculating the ratios of the absorbances at various wavelengths and comparing the values to those of a reference sample known to have an acceptable dispersion of magnetic particles, transparency and haze. The reference sample is given a QF of 100. The value is independant of laydown since it is based on ratios of absorbances.

The solvent reference example originates from a high quality solvent-coated dilute suspension of Cobalt surface treated $\gamma$-$Fe_2O_3$ magnetic particles and is used here as a benchmark for the aqueous based coatings which contain the same magnetic particles. A well-dispersed coating will have an absorbance spectrum which falls off relatively rapidly above 390 nm, eventually becoming virtually transparent in the 800 nm range, while a relatively poorly-dispersed coating will not fall off as rapidly and have relatively higher absorbance. Hence there is a connection between dispersion quality and the rate at which absorbance decreases at higher wavelengths in the visible region due to the effect of particle size on the shape of the turbidity spectrum.

The rate of decrease may be quantified by taking a ratio of absorbances at different wavelengths. After reading the absorbance levels at 390, 540, and 740 nm measured by a Perkin-Elmer 320 spectrophotometer, the Quality Factor QF is determined as follows:

$$QF = \frac{100 \left[ \frac{Abs.(390)}{Abs.(740)} + \frac{\frac{Ref.Abs.(390)}{Ref.Abs.(740)}}{\frac{Ref.Abs.(390)}{Ref.Abs.(540)}} \cdot \frac{Abs.(390)}{Abs.(540)} \right]}{2 \left[ \frac{Ref.Abs.(390)}{Ref.Abs.(740)} \right]}$$

Abs.(nm) refers to the absorbance of the coating (or optical density due to scattering and absorbance) at the indicated wavelength, while Ref.Abs.(nm) refers to the absorbance of a solvent-coated reference sample known to have an acceptable particle size distribution. This formula places roughly equal weight on the two different absorbance ratios (exactly equal for the reference sample) and, because it is based on ratios of absorbances, it is not dependent upon the laydown level. A quality factor for comparative purposes may also be obtained using other absorbance wavelengths in addition to or in place of those specified above if desired.

The reference sample mentioned above assigned a QF of 100 is a magnetic layer on a support produced from an organic casting solution of magnetic particles as described in Example 7 of U.S. Pat. No. 5,217,804. The Reference* sample cited in Table I below is similar to the standard reference sample except that it contains the abrasive particles (AKP 50) which causes the QF to decrease from 100 to 84.

Table I below shows the various polymeric additives that were used and the QFs obtained for the dried coatings. The results demonstrate the advantageous effect of adding a polyelectrolyte to an aqueous magnetic coating composition comprising gelatin as a film-forming binder.

TABLE I

| EXAMPLE No. | POLYMERIC ADDITIVE [wt % based on weight of gelatin] | AVERAGE MW | QUALITY FACTOR |
|---|---|---|---|
| 1 | Polystyrene sulfonate, sodium salt [5%] (National Starch Chemical Co. TL502) | ~800,000 | 81 |
| 2 | Polystyrene sulfonate, sodium salt [7%] (National Starch Chemical Co. TL502) | ~800,000 | 83 |
| 3 | Polystyrene sulfonate, sodium salt [10%] (National Starch Chemical Co. TL502) | ~800,000 | 89 |
| 4 | Polystyrene sulfonate, sodium salt [5%] (National Starch Chemical Co. TL132) | ~110,000 | 73 |
| 5 | Polyacrylic acid [5%] (Scientific Polymer Products Inc.) | ~250,000 | 80 |
| 6 | Poly(styrene sulfonate, sodium salt-co-maleic anhydride) (3:1 molar ratio) [5%] | >250,000 | 90 |
| 7 | Xanthan Gum [5%] (Sigma Chemical Co.) | >1,000,000 | 75 |
| 8 | Dextran sulfate, sodium salt [5%] (PolySciences) | ~500,000 | 70 |
| 9 (Comparison) | Methyl cellulose [5%] (Visc. of 2% solution @ 25° C. = 4,000 cp) (Sigma Chemical Co.) | — | 53 |
| 10 (Comparison) | Poly(styrene sulfonate, sodium salt-co-maleic anhydride) [5%] (National Starch Chemical Co. Narlex D72) | ~15,000 | 43 |
| 11 (Comparison) | None [5% added gelatin] | — | 64 |

TABLE I-continued

| EXAMPLE No. | POLYMERIC ADDITIVE [wt % based on weight of gelatin] | AVERAGE MW | QUALITY FACTOR |
|---|---|---|---|
| Reference* | Organic Solvent Coated | — | 84 |

The invention has been described in detail with particular reference to preferred embodiments thereof, but it is to be understood that variations and modifications can be effected within the spirit and scope of the invention.

What is claimed is:

1. An aqueous coating composition for forming a transparent magnetic recording layer comprising a fine solid particle aqueous dispersion of dispersed magnetic particles, gelatin, and from 0.1–50 wt. %, based on the weight of the gelatin, of a polyelectrolyte having a molecular weight of at least about 50,000.

2. A coating composition according to claim 1, wherein the polyelectrolyte comprises i) a water soluble or dispersible synthetic polymer derived from monomers having one or more —OSO$_3$M, —SO$_3$M, —COOM, or —OPO(OM)$_2$ pendant anionic moieties, where M represents a hydrogen atom or a cationic counter ion, or ii) a naturally occurring polymeric material or derivative thereof bearing pendant anionic moieties as described in i).

3. A coating composition according to claim 1, wherein the polyelectrolyte comprises a water soluble or dispersible synthetic polymer derived from monomers having one or more —OSO$_3$M, —SO$_3$M, —COOM, or —OPO(OM)$_2$ pendant anionic moieties, where M represents a hydrogen atom or a cationic counter ion.

4. A coating composition according to claim 3, wherein the polyelectrolyte comprises a polystyrene sulfonate, a poly(acrylamide-co-2-acrylamido-2-methylpropane sulfonate), a poly(styrene-co-maleic acid), a polyesterionomer, or an acrylic acid containing polymer.

5. A coating composition according to claim 2, wherein the polyelectrolyte comprises a polysaccharide.

6. A coating composition according to claim 1, comprising from 0.1–25 wt. %, based on the weight of the gelatin, of the polyelectrolyte.

7. A coating composition according to claim 1, comprising from 1–10 wt. %, based on the weight of the gelatin, of the polyelectrolyte.

8. A coating composition according to claim 1, wherein the polyelectrolyte has a molecular weight of from about 100,000 to 6,000,000.

9. A coating composition according to claim 1, wherein the polyelectrolyte is formed from about 2 to 100 wt. % of anionic monomers.

10. A coating composition according to claim 1, wherein the polyelectrolyte is formed from about 50 to 100 wt. % of anionic monomers.

11. A coating composition of claim 1, further comprising a surface active dispersant having an HLB number of at least 8.

12. An aqueous coating composition for forming a transparent magnetic recording layer comprising a fine solid particle aqueous dispersion of dispersed magnetic particles; gelatin; from 0.1–50 wt. %, based on the weight of the gelatin, of a polyelectrolyte having a molecular weight of at least about 50,000; and a surface active dispersant having an HLB number of at least 8 selected from the group of amphipathic water-soluble or water-dispersible polymers having a molecular weight of less than 50,000 represented by one of the following structures I–IV:

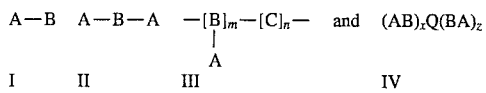

wherein each A independently represents 1 to about 150 repeat units of a water-soluble component; B and C each represent a linear or branched alkyl, aryl, alkaryl or cyclic alkyl radical containing at least 7 carbon atoms, or 3 to about 100 repeat units of a propylene oxide or higher alkylene oxide or combinations thereof; Q represents a multivalent linking group; m=50–100 mole % and n =1–50 mole %, with the proviso that m+n=100 mole %, x=1 or 2, and z=1 or 2.

13. A coating composition of claim 12, wherein the dispersant has the formula:

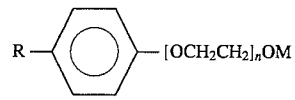

n=5–25

R=aryl, alkyl, aralkyl

M=H, SO$_3^-$ X$^+$, or PO$_3^{2-}$ 2X$^+$ where X is cation.

14. A coating composition of claim 12, wherein the dispersant is an phosphated alkyl or aryl phenol alkoxylate.

15. A coating composition of claim 14, wherein the dispersant has the formula:

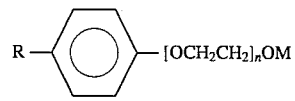

n=5–25

R=alkyl or aryl, M=PO$_3^{2-}$ 2X$^+$

X=Na$^{30}$, K$^+$ or NH$_4^+$.

16. A coating composition of claim 1, which further contains abrasive particles.

17. A photographic element comprising a photographic support, a light sensitive layer and a photographically transparent magnetic recording layer, wherein the magnetic recording layer has been prepared by forming a coating composition according to claim 1, and applying said coating composition onto said photographic support.

18. A photographic element according to claim 17, wherein the coating composition has been prepared by adding an aqueous solution of gelatin and a polyelectrolyte to a dispersion of magnetic particles in an aqueous medium containing a surface active dispersant having an HLB number of at least 8.

19. A photographic element according to claim 17, wherein the polyelectrolyte comprises a water soluble or dispersible synthetic polymer derived from monomers having one or more —OSO$_3$M, —SO$_3$M, —COOM, or —OPO(OM)$_2$ pendant anionic moieties, where M represents a hydrogen atom or a cationic counter ion.

20. A coating composition of claim 1, wherein the magnetic particles exhibit saturation magnetization above 70 emu/g.

21. A coating composition of claim 12, wherein the magnetic particles exhibit saturation magnetization above 70 emu/g.

22. A photographic element of claim 17, wherein the magnetic particles exhibit saturation magnetization above 70 emu/g.

* * * * *

UNITED STATES PATENT AND TRADEMARK OFFICE
CERTIFICATE OF CORRECTION

PATENT NO. : 5,531,913
DATED : July 2, 1996
INVENTOR(S) : Mridula Nair, et al

It is certified that error appears in the above-indentified patent and that said Letters Patent is hereby corrected as shown below:

Column 22, line 47    Delete "$X=Na^{30}, K^+ \text{ or } NH_4^+$." and insert -- $X=Na^+, K^+$ or $NH_4^+$. --

Signed and Sealed this

Eighteenth Day of February, 1997

Attest:

BRUCE LEHMAN

*Attesting Officer*            *Commissioner of Patents and Trademarks*